United States Patent
Wagh et al.

(10) Patent No.: US 11,886,228 B2
(45) Date of Patent: Jan. 30, 2024

(54) INTERFACE BUS COMBINING

(71) Applicant: pSemi Corporation, San Diego, CA (US)

(72) Inventors: Poojan Wagh, Sleepy Hollow, IL (US); David A. Podsiadlo, San Diego, CA (US)

(73) Assignee: pSemi Corporation, San Diego, CA (US)

(*) Notice: Subject to any disclaimer, the term of this patent is extended or adjusted under 35 U.S.C. 154(b) by 0 days.

(21) Appl. No.: 17/354,530

(22) Filed: Jun. 22, 2021

(65) Prior Publication Data
US 2022/0405227 A1    Dec. 22, 2022

(51) Int. Cl.
| | |
|---|---|
| G06F 13/38 | (2006.01) |
| G06F 13/42 | (2006.01) |
| G06F 13/40 | (2006.01) |
| G06F 9/30 | (2018.01) |

(52) U.S. Cl.
CPC ...... G06F 13/4027 (2013.01); G06F 9/30101 (2013.01)

(58) Field of Classification Search
None
See application file for complete search history.

(56) References Cited

U.S. PATENT DOCUMENTS

| | | | | |
|---|---|---|---|---|
| 7,275,121 B1* | 9/2007 | Wong | ...................... | G06F 9/526 |
| | | | | 710/240 |
| 11,676,169 B1* | 6/2023 | Bhow | ...................... | G06N 7/01 |
| | | | | 705/14.25 |
| 2003/0046475 A1* | 3/2003 | Black | ...................... | G06F 13/405 |
| | | | | 710/310 |
| 2004/0019704 A1* | 1/2004 | Sano | ................... | G06F 15/17343 |
| | | | | 709/252 |
| 2004/0044813 A1* | 3/2004 | Moss | .................. | G06F 13/4031 |
| | | | | 710/110 |

(Continued)

FOREIGN PATENT DOCUMENTS

WO    2008118443    10/2008

OTHER PUBLICATIONS

Nold, Michael, International Search Report received from the EPO dated Aug. 30, 2022 for appln. No. PCT/US2022/029488, 14 pgs.

*Primary Examiner* — Hyun Nam
(74) *Attorney, Agent, or Firm* — JAQUEZ LAND GREENHAUS & MCFARLAND LLP; John Land, Esq.

(57) ABSTRACT

Circuits and methods enabling common control of an agent device by two or more buses, particularly MIPI RFFE serial buses. In essence, the invention provides flagging signals designating completed register write operations to denote which of two registers are active, such that synchronization is accomplished in a clock-free manner. One embodiment includes at least two decoders, each including a common register and a bus (S/P) decoder coupled to a respective bus and to the common register. The S/P decoder asserts a write-complete signal when a write operation to a corresponding common register is completed. A multiplexer has at least two selectable input bus ports coupled to the common registers within the at least two decoders. A selection circuit selects an input bus port of the multiplexer in response to the assertion of a last write-complete signal from the S/P decoders.

19 Claims, 8 Drawing Sheets

(56) References Cited

U.S. PATENT DOCUMENTS

| | | | |
|---|---|---|---|
| 2005/0289268 A1* | 12/2005 | Miller | G06F 13/4054 |
| | | | 710/110 |
| 2007/0136528 A1* | 6/2007 | Hauck | G06F 13/385 |
| | | | 711/115 |
| 2010/0020816 A1* | 1/2010 | Gulati | H04L 12/56 |
| | | | 370/465 |
| 2015/0039928 A1* | 2/2015 | Lin | H04N 21/43632 |
| | | | 713/600 |
| 2017/0124016 A1* | 5/2017 | Gerber | G06F 13/4282 |
| 2022/0137931 A1* | 5/2022 | Otenko | G06F 8/20 |
| | | | 717/100 |
| 2022/0206797 A1* | 6/2022 | Herdrich | G06F 9/30101 |

* cited by examiner (Non-Functional)

INTERFACE BUS COMBINING

BACKGROUND

(1) Technical Field

This invention relates to electronic circuits, and more particularly to electronic integrated circuits interconnected by a communications bus.

(2) Background

Modern electronic circuits, particularly radio frequency (RF) electronic circuits, are commonly implemented by interconnecting one or more integrated circuits ("ICs", also known as "dies"), each providing one or more desired functions, such as amplification, modulation/demodulation, tuning, switching, etc. It is also common to embed at least one IC and additional external circuit elements (e.g., filters, tuning elements, etc.) in a circuit module configured to be coupled to other circuit modules and/or additional external circuit elements or system elements (e.g., user controls, antennas, etc.).

In the realm of RF electronics, RF communication systems typically include "RF front-end" (RFFE) circuitry, which is a generic term for all of the circuitry between a radio antenna up to and including the mixer stage of a radio. An industry standard serial bus has been developed by the Mobile Industry Processor Interface (MIPI) Alliance to interconnect sets of circuit modules for RFFE circuitry. In particular, the MIPI RF Front-End (RFFE) Control Interface serial bus has been widely adopted in a variety of RF systems, particularly mobile wireless systems.

The MIPI RFFE serial bus is a serial, two-wire, controller/agent interface originally designed for controlling a variety of RF front end devices, such as amplifiers, antenna switches, filters, etc. (the MIPI bus has since been extended for controlling other modules or devices as well). One wire is a bi-directional serial data line (SDATA), and the other wire is a "Bus Controller" generated synchronous clock (SCLK). A third wire, VIO, may be used as a voltage reference/supply, to control power consumption, and to provide reset and enable functions for the MIPI RFFE serial bus.

FIG. 1 is a block diagram showing an example of a portion of an RF Front-End circuit 100. A MIPI controller 102 is coupled by a serial data line SDATA and clock line SCLK to three agent circuits, a power amplifier circuit 104, a filter circuit 106, and a one-to-many switch circuit 108 (to avoid clutter, connections to VIO are omitted). Each of the coupled agent circuits 104, 106, 108 includes an internal Decoder that converts serial data on SDATA into register addresses and 8-bit command/data words which may be stored in addressed registers.

Taking a particular implementation of the MIPI RFFE serial bus as one example, the maximum number of agent devices on the serial bus is 15. The SCLK signal line provides a clock signal that is always driven by the controller device on the serial bus, at a specified maximum clock rate (e.g., 26 MHz MIPI RFFE 1.0, and 52 MHz for MIPI RFFE 2.0). There is always a controller device, and up to 15 agent devices, each coupled to the SCLK and SDATA signal lines through a respective control and status (C/S) decoder interface. In general, agent devices may support several operating modes (e.g., "startup", "active state", "shutdown", "low-power mode", etc.) and device-specific functions (e.g., operating parameters for amplifiers, switches, programmable tuning and/or filter components, etc.), which are selected by issuing command messages through the bit-serial SDATA signal line under the control of the SCLK signal line.

The SDATA signal line is driven high by the controller while the SCLK signal line remains low to initiate a transfer; this is called the Sequence Start Condition or SSC. The SDATA signal line is driven high for one clock period and then low for one clock period while the SCLK signal line is low. After an SSC event occurs, the SCLK and SDATA signal lines are driven by the controller device (e.g., MIPI controller 102) to transfer a 12-bit command frame (plus 1-bit odd parity).

The 12-bit command frame consists of two parts, a 4-bit agent Device Address and an 8-bit operational command. The first 4 bits of the command frame are an agent address, SA[3:0], corresponding to a unique agent identifier (USID). If SA[3:0] are all zeroes, then the command is broadcast to and acted upon by all agent devices. Commands that all devices must respond to may include, for example, commands to "go to low power mode" or "reset to a known state". The next 8 bits of the command frame, C[8:0], are the operational command, comprising a 3-bit command type and a 5-bit Register Address, A[4:0]. An agent device having a USID that matches SA[3:0]decodes the operational command to determine the type of command and a designated Register Address within the agent device.

FIG. 2 is a block diagram of a generic agent device 200. The agent device 200 includes a decoder 202 which in turn includes a bus decoder 204, which is a serial-to-parallel decoder for a MIPI RFFE serial bus. The bus decoder 204 has the characteristic that it receives and decodes WRITE commands, data, and an address of a register. Decoded commands and data from the bus decoder 204 are stored in a register file 206 that includes a set (e.g., 16 or 32) of addressable registers 208. The commands and data are provided to controller circuitry 210, in known manner.

In some implementations of the MIPI RFFE serial bus, only two command types are supported: Register Read (for reading status information from an agent device) and Register Write (for providing control information to an agent device). The command types may be respectively indicated by a code in the first 3 bits of the 8-bit operational command (e.g., Read=binary "011", Write=binary "010"). The last 5 bits of the 8-bit operational command designate a Register Address, A[4:0], within the agent device; accordingly, each agent device can support up to 32 registers using the Register Write and Register Read commands (in some embodiments of agent devices, only a subset of the addressable register space is supported).

If a command indicates a Register Write command type, then the command frame is followed by a Write Data frame driven by the controller device. A single Write Data frame may contain from a few bits of payload data up to multiple (e.g., 16) bytes of payload data. Multiple Write Data frames may be transmitted in sequence to an addressed agent device. An addressed agent device will store received payload data in one or more addressed registers, and respond as appropriate to the function of the agent device.

Other serial bus standards (e.g., the Serial Peripheral Interface, I2C, I2S, SMBus, and/or PMBus) typically have comparable command frame structures and command types. In addition, parallel bus standards (e.g., AMBA) are used in some systems.

While the MIPI RFFE serial bus and similar buses generally provide adequate communication functionality for many RF Front-End circuits, a drawback is that multiple buses cannot be accommodated. For example, new cell phone models require simultaneous support of 4G and 5G technologies. Because of the differences in frequency bands and data rates between 4G and 5G technologies, separate transceivers and separate command buses (i.e., MIPI RFFE serial buses) may be used.

For example, FIG. 3 is a block diagram 300 showing an example of a portion of a non-functional circuit having dual MIPI RFFE serial buses and dual RF Front-End circuits. A first MIPI controller 302a is coupled by a serial data line SDATA and clock line SCLK to three agent circuits, a power amplifier circuit 304a, a filter circuit 306b, and a one-to-many switch circuit 308. The three agent circuits coupled to the first MIPI controller 302a may be, for example, to process a mid-band of frequencies. The one-to-many switch circuit 308 may be coupled to multiple antennas, and used to direct amplified and filtered mid-band frequencies to a selected one of those antennas.

A desired second MIPI controller 302b (shown in dashed outline) is coupled by a serial data line SDATA and clock line SCLK to three agent circuits, a power amplifier circuit 304b, a filter circuit 306b, and the one-to-many switch circuit 308. (To avoid clutter, connections to VIO are omitted). The three agent circuits coupled to the second MIPI controller 302b may be intended, for example, to process a high-band of frequencies. The one-to-many switch circuit 308 may be used to direct amplified and filtered high-band frequencies to a selected one of antennas. Thus, both the mid-band and high-band share the same one-to-many switch circuit 308, and accordingly there would be a need to provide commands to the one-to-many switch circuit 308 from both the first and second MIPI controllers 302a, 302b.

Unfortunately, the architecture shown in FIG. 3 is not possible using two MIPI RFFE buses because there are two clock domains with non-deterministic clocks. Thus, either bus could try to write commands to the internal register file of an agent device without regard for the activity of the other bus.

A general method for receiving signals from two different clock domains is to use a synchronizer from one (secondary) clock domain to a primary clock domain. Then an arbiter (e.g., a mutual-exclusion or mutex circuit) may be used in the primary domain. However, this method requires that both clock signals from the two different clock domains be available at all times to the synchronizer. This cannot happen with a MIPI RFFE bus because clock signals are sent only when there is a transaction; accordingly, both clock signals from the two different clock domains would be always available for a synchronizer.

Accordingly, there is a need for circuits and methods that enable common control of one or more agent devices by two or more buses, particularly MIPI RFFE serial buses. The present invention addresses this need.

SUMMARY

The present invention encompasses circuits and methods that enable common control of one or more agent devices by two or more buses, particularly MIPI RFFE serial buses. In essence, the invention provides flagging signals designating completed register write operations to denote which of two registers are active, such that synchronization is accomplished in a clock-free manner.

One embodiment comprises a circuit that enables common control of one or more agent devices by two or more buses, the circuit including: A circuit that enables common control of one or more agent devices by two or more buses, the circuit including: at least two decoders, each including at least one common register and a bus decoder coupled to a respective bus and to the at least one common register, the bus decoder configured to assert a write-complete signal when a write operation to a corresponding one of the at least one common register is completed; a multiplexer having at least two selectable input bus ports each coupled to a respective one of the at least one common register within the at least two decoders; and a selection circuit, coupled to two or more of the bus decoders and to the multiplexer, the selection circuit configured to select an input bus port of the multiplexer in response to the assertion of a last write-complete signal from the coupled bus decoders.

A method encompassed by the invention includes enabling common control of one or more agent devices by two or more buses by asserting a write-complete signal when a write operation from one of the two or more buses to a common register is completed, and selecting the content of the common register associated with one of the two or more buses in response to the assertion of a last write-complete signal.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses circuits and methods that enable common control of one or more agent devices by two or more buses, particularly MIPI RFFE serial buses. In essence, the invention provides flagging signals designating completed register write operations to denote which of two registers are active, such that synchronization is accomplished in a clock-free manner.

First Embodiment

Figure 1:
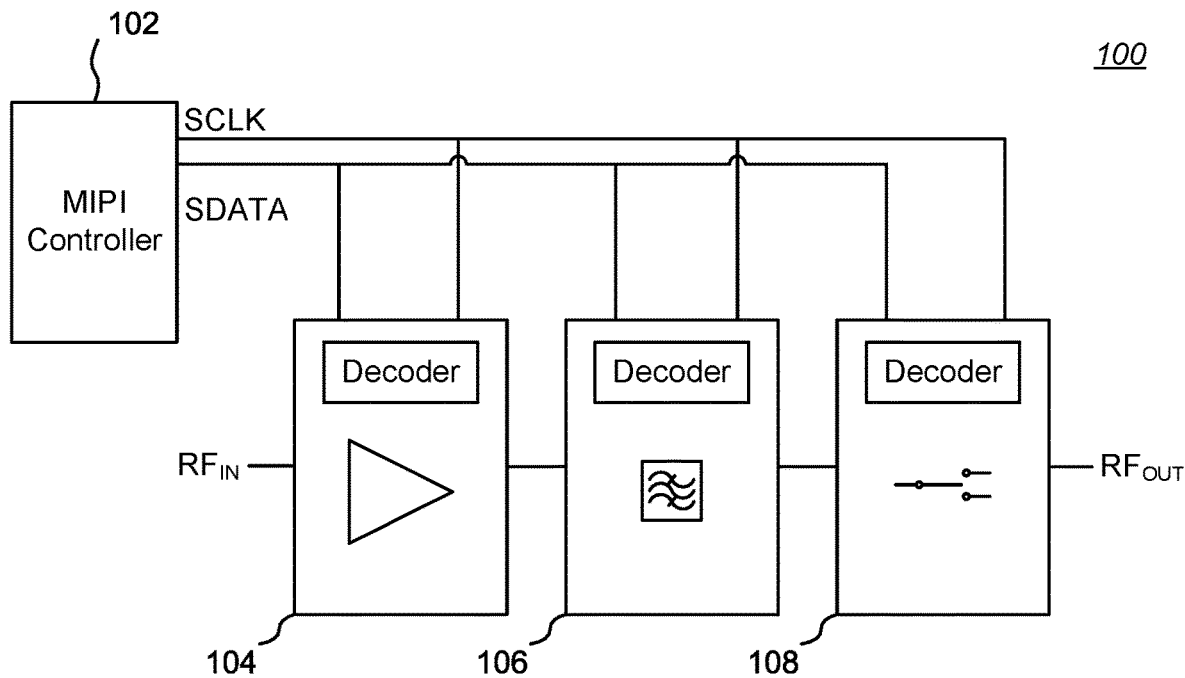
FIG. 1 is a block diagram showing an example of a portion of an RF Front-End circuit.
Figure 2:
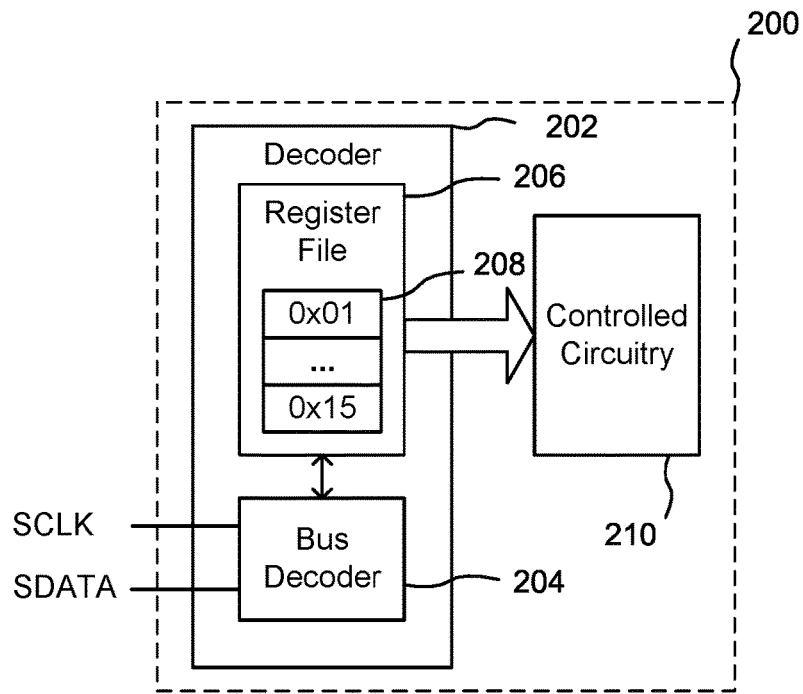
FIG. 2 is a block diagram of a generic agent device.
Figure 3:
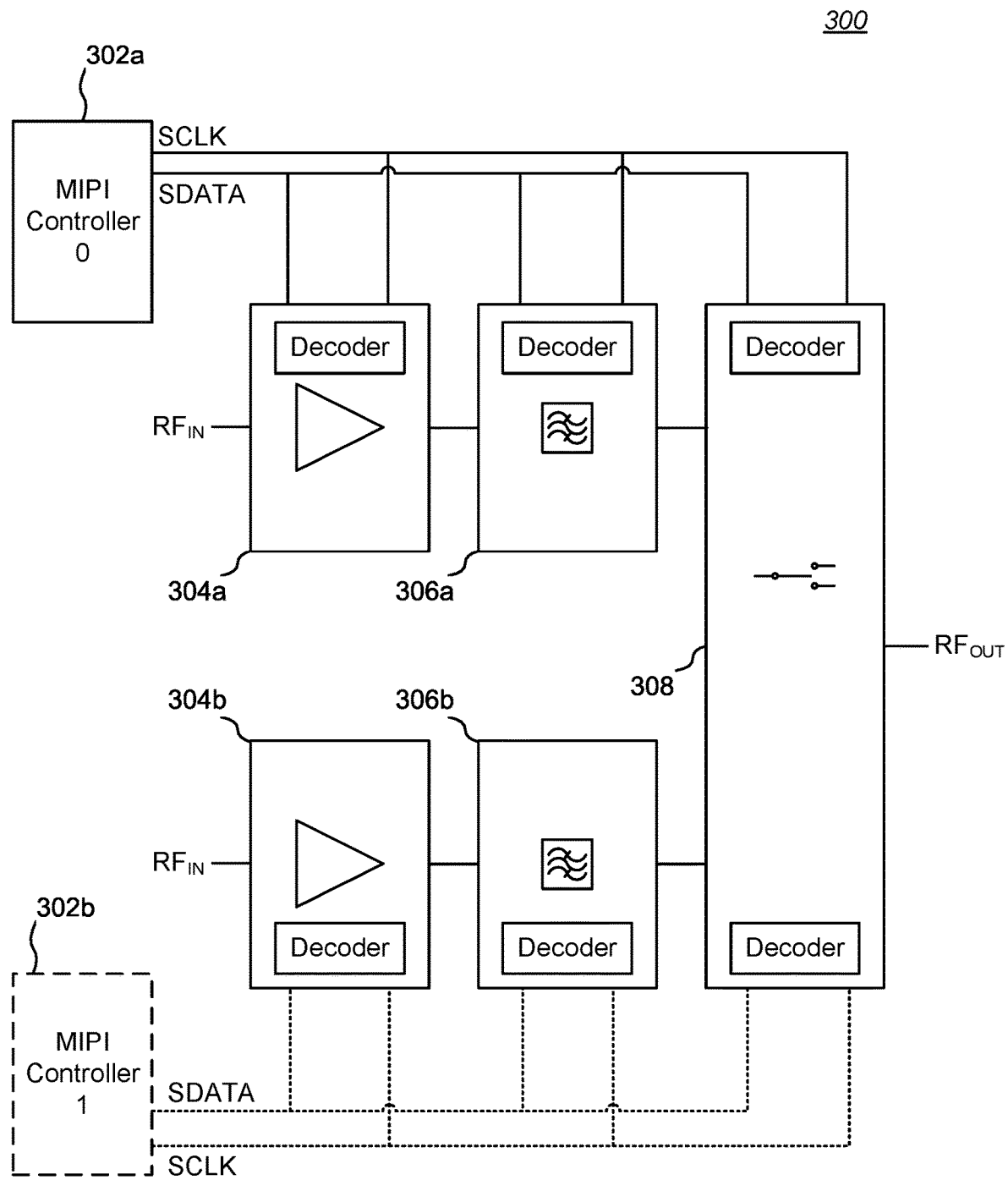
FIG. 3 is a block diagram showing an example of a portion of a non-functional circuit having dual MIPI RFFE serial buses and dual RF Front-End circuits.
Figure 4A:
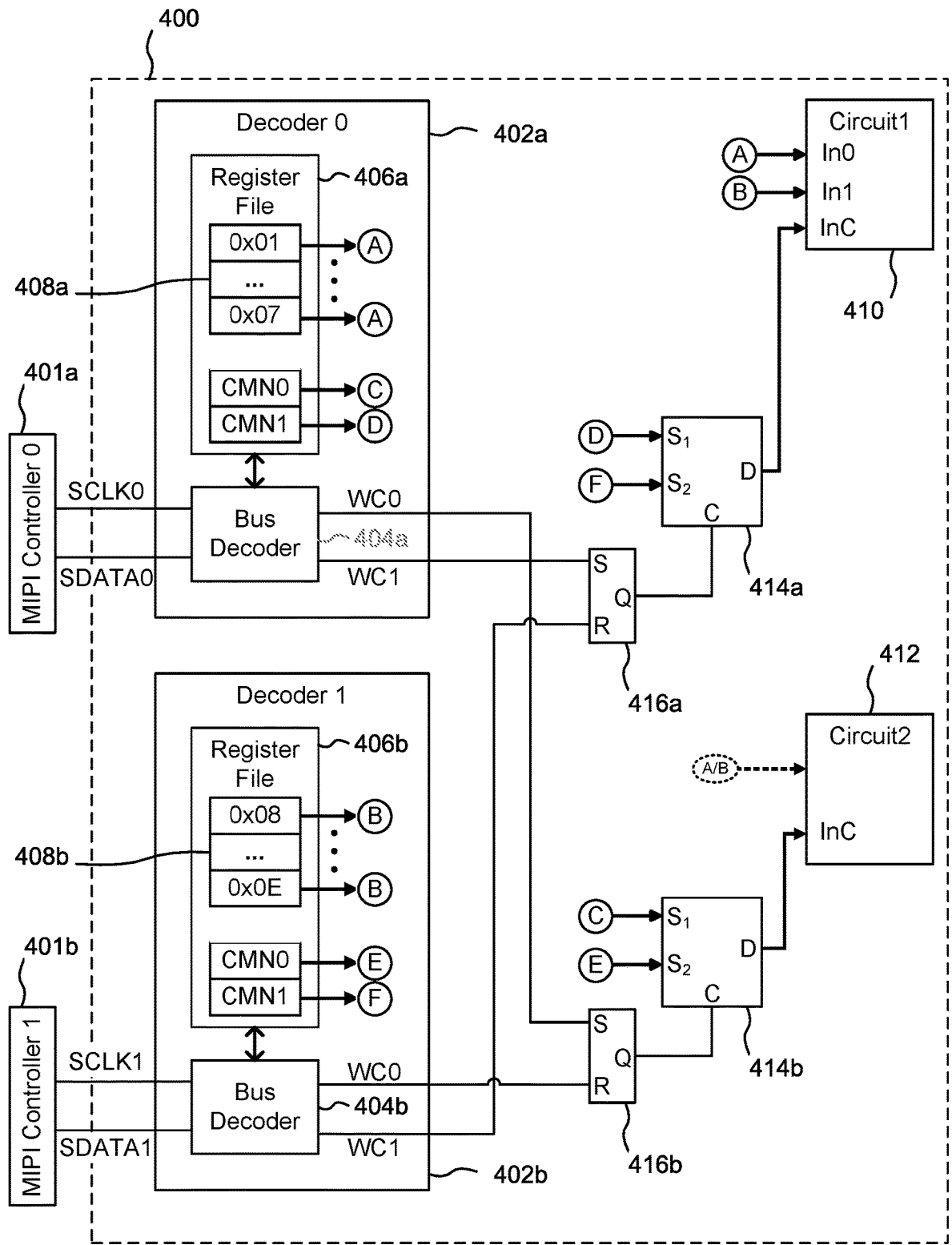
FIG. 4A is a block diagram showing an example of an RF Front-End agent device supporting control by dual MIPI RFFE serial buses.

FIG. 4A is a block diagram showing an example of an RF Front-End agent device 400 supporting control by dual MIPI RFFE serial buses. Each agent device that requires common control by multiple buses is provided with a corresponding number of decoders. In the illustrated example, two MIPI controllers 401a, 401b are shown respectively coupled to corresponding decoders 402a, 402b by corresponding SCLK and SDATA serial lines.

Each decoder 402a, 402b includes a bus decoder 404a, 404b, such as a serial-to-parallel decoder. Note that while the disclosed example embodiments show serial-to-parallel decoders, the invention is applicable to embodiments using parallel busses in which a clock signal is associated with parallel address and data busses. Decoded commands from the bus decoders 404a, 404b are stored in a respective register file 406a, 406b that includes a set (e.g., 16 or 32) of addressable registers 408a, 408b. Ultimately, one or more of the addressable registers 408a, 408b will be coupled to controlled circuits; in the illustrated example, two controlled circuits 410, 412 are shown. The controlled circuits 410, 412 may include, for example, amplifiers, couplers, switches, programmable tuning, and/or filter components.

In the illustrated example, the addressable registers 408a, 408b that will store commands and data that are not common to the controlled circuits 410, 412 are uniquely labeled 0x01 . . . 0x07 in register file 406a and 0x07 . . . 0x0E in register file 406b (collectively, "0x0 #"). In the illustrated example, the addressable registers 408a, 408b that will store commands and data that are common to the controlled circuits 410, 412 are labeled CMN0 and CMN1 (while the common registers are shown separated from the associated unique 0x0 # registers, all of the common and unique registers are part of a respective register file 406a or 406b).

In the illustrated example, the 0x0 # registers of the decoders 402a, 402b may be coupled to one or more controlled circuits 410, 412. For example, controlled circuit 410 is shown as coupled by word-wide buses to the A set of 0x0 # registers from decoder 402a and the B set of 0x0 # registers from decoder 402b. Internal to controlled circuit 410 would be the necessary logic to utilize commands from either MIPI controller 401a, 401b.

For controlled circuit 412, the A set of 0x0 # registers from decoder 402a and/or the B set of 0x0 # registers from decoder 402b may be optionally coupled, is indicated by the dotted connection line. However, controlled circuit 412 may be of a type that responds only to commands from the common registers CMN0, CMN1, and accordingly may not be connected to the 0x0 # registers from decoder 402a or 402b.

The bus decoders 404a, 404b may be essentially similar to conventional bus decoders, but with added output signals to indicate when certain Register Write operations are complete (i.e., all bits of a received command and/or data frame have been received over the corresponding SDATA serial line and stored in an addressed register). In the illustrated example, when a Register Write operation to the CMN0 register of a decoder 402a, 402b is complete, then a "Write Complete" output signal WC0 is momentarily asserted by the associated bus decoder 404a, 404b. Similarly, when a Register Write operation to the CMN1 register of a decoder 402a, 402b is complete, then a "Write Complete" output signal WC1 is momentarily asserted by the associated bus decoder 404a, 404b.

Both of the controlled circuits 410, 412 are shown as having a common input bus port InC, which is shown connected to an output bus port D of a respective multiplexer 414a, 414b. In the illustrated example, each multiplexer 414a, 414b has selectable input bus ports $S_1$, $S_2$, either of which may be coupled through to a corresponding output bus port D based on a selection control signal applied to a selector port C. In the illustrated example, for multiplexer 414a, $S_1$ is coupled to the CMN1 register of decoder 402a, and $S_2$ is coupled to the CMN1 register of decoder 402b. For multiplexer 414b, $S_1$ is coupled to the CMN0 register of decoder 402a, and $S_2$ is coupled to the CMN0 register of decoder 402b.

The selector ports C of the multiplexers 414a, 414b are coupled to an output port Q of respective set-reset (S-R) flipflops 416a, 416b. In the illustrated example, for flipflop 416a, input S is coupled to the WC0 signal from bus decoder 404a, and input R is coupled to the WC0 signal from bus decoder 404a. Similarly, for flipflop 416b, input S is coupled to the WC1 signal from bus decoder 404a, and input R is coupled to the WC1 signal from bus decoder 404a.

The circuit configuration in FIG. 4A allows either MIPI controller 401a, 401b to write to the common registers CMN0 and/or CMN1 of a respective decoder 402a, 402b and have that register content supplied to one or more controlled circuits 410, 412 within an RF Front-End agent device 400. A "last write wins" (LWW) policy is utilized to select which of the common registers CMN0 and/or CMN1 are coupled to the internal controlled circuits 410, 412. Basically, for any common register that exists in both decoders 402a, 402b, the LWW mechanism ensures that whichever register was written to last by its corresponding MIPI controller 401a, 401b is declared the winner. This policy allows for mutually exclusive arbitration between MIPI RFFE buses, and forms a deterministic rule for which of the two buses' data is effectively applied to the internal controlled circuits 410, 412. At the same time, the LWW policy provides design flexibility, in that a customer can select which bus to use for writing common commands and/or data to an RF Front-End agent device 400.

As an example of operation, suppose that MIPI controller 401a writes a command to decoder 402a addressed to register CMN0. Register CMN0 of decoder 402a is coupled to the $S_1$ input of multiplexer 314b, while register CMN0 of decoder 402b is coupled to the $S_2$ input of multiplexer 314b. When a Register Write operation to the CMN0 register of decoder 402a is complete, then a Write Complete output signal WC0 is asserted by the associated bus decoder 404a. That WC0 signal sets flipflop 416b, which causes multiplexer 414b to pass the contents of register CMN0 of decoder 402a through to the controlled circuit 412.

Conversely, suppose that MIPI controller 401b writes a command to decoder 402b addressed to register CMN0. When a Register Write operation to the CMN0 register of decoder 402b is complete, then a Write Complete output signal WC0 is asserted by the associated bus decoder 404b. That WC0 signal resets flipflop 416b, which causes multiplexer 414b to pass the contents of register CMN0 of decoder 402b through to the controlled circuit 412.

Whichever MIPI controller 401a, 401b last writes to its associated CMN0 register, the corresponding Write Complete output signal WC0 will cause the content of the last written CMN0 register to be coupled through to the controlled circuit 412.

In a similar fashion, suppose that MIPI controller 401a writes a command to decoder 402a addressed to register CMN1. Register CMN1 of decoder 402a is coupled to the $S_1$ input of multiplexer 314a, while register CMN1 of decoder 402b is coupled to the $S_2$ input of multiplexer 314a. When a Register Write operation to the CMN1 register of decoder 402a is complete, then a Write Complete output signal WC1 is asserted by the associated bus decoder 404a. That WC1 signal sets flipflop 416a, which causes multiplexer 414a to pass the contents of register CMN1 of decoder 402a through to the controlled circuit 410.

Conversely, suppose that MIPI controller 401b writes a command to decoder 402b addressed to register CMN1. When a Register Write operation to the CMN1 register of decoder 402b is complete, then a Write Complete output signal WC1 is asserted by the associated bus decoder 404b. That WC1 signal resets flipflop 416a, which causes multiplexer 414a to pass the contents of register CMN1 of decoder 402b through to the controlled circuit 410.

Again, whichever MIPI controller 401a, 401b last writes to its associated CMN1 register, the corresponding Write Complete output signal WC1 will cause the content of the last written CMN1 register to be coupled through to the controlled circuit 410.

There may be cases where the Write Complete output signals (e.g., WC0 and WC1) conflict. For example, in some 5G and 4G radio systems, MIPI commands may come from different integrated circuits without coordination. In the case where two or more bus decoders (e.g., 404a and 404b) concurrently output a Write Complete signal, there may be some contention as to which signal wins under the "last write wins" policy. Such contention may be resolved in a number of ways. For example, the S-R flipflops (e.g., 416a, 416b) may be designed to prefer the S (Set) input over the R (Reset) input if there is contention.

The disclosed circuits and methods for directing control circuitry by multiple different interfaces provide a number of benefits, such as a deterministic policy (since the last write to either bus interface persists), convenience for a customer (since the customer may write to either bus interface), and ease of implementation (since the LWW policy is implemented without clocked circuits, avoiding considerable issues with clock synchronization and asynchronous clocking domains). Implementation is simple, requiring little in the way of additions to a conventional MIPI RFFE architecture, and each MIPI controller remains independent.

Alternative Embodiments

Figure 4B:
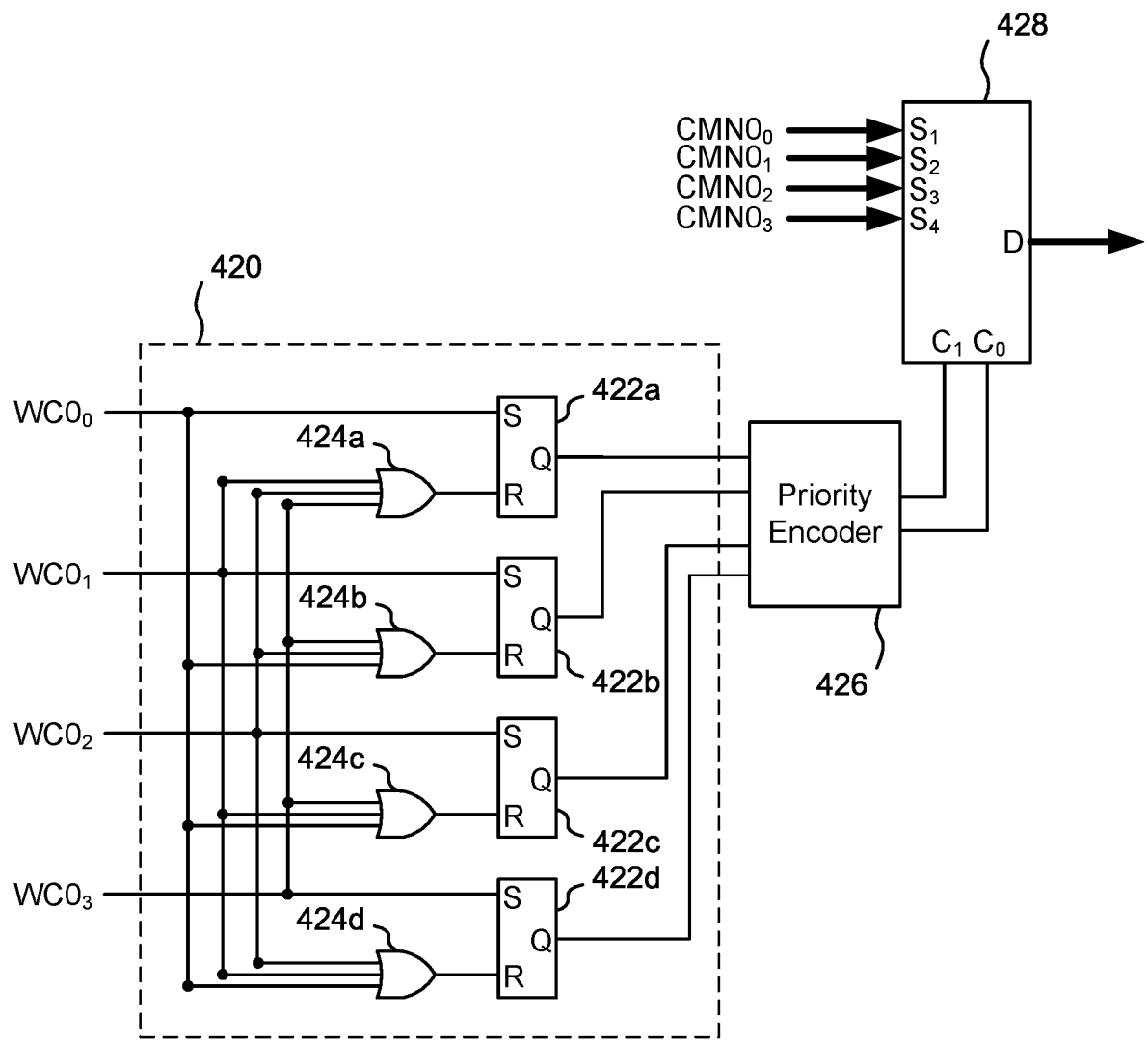
FIG. 4B is a block diagram of a circuit that accommodates common registers within four decoders corresponding to four MIPI controllers like those shown in FIG. 4A.

The concepts shown in FIG. 4A may be extended to additional MIPI controllers. For example, FIG. 4B is a block diagram of a circuit that accommodates common registers within four decoders corresponding to four MIPI controllers like those shown in FIG. 4A. The flipflops 416a, 416b of FIG. 4A would be replaced by a "radio button" circuit 420 that includes 4 flipflops 422a . . . 422d. Each flipflop 422a . . . 422d would be set by a corresponding Write Complete output signal WC0x from an associated bus decoder within a corresponding decoder (not shown, but like the bus decoders 404a, 404b and decoders 402a, 402b of FIG. 4A). In addition, each Write Complete output signal WC0x is coupled to the reset input of each other flipflop through an OR gate 424a . . . 424d associated with each other flipflop.

Thus, for example, when Write Complete output signal WC0o is asserted, flipflop 422a is set, and flipflops 422b . . . 422d are reset, and when Write Complete output signal WC03 is asserted, flipflop 422d is set, and flipflops 422a . . . 422c are reset. The result is that the flipflops 422a . . . 422d and OR gates 424a . . . 424d function like a radio button circuit, in which the last Write Complete output signal WC0x to a flipflop is the only asserted output (e.g., a "1") of the radio button circuit, and all other flipflops have the opposite logic state (e.g., "0").

The outputs of the flipflops 422a . . . 422d are coupled to a conventional priority encoder 426 which converts the input signals to a binary encoded output. The binary encoded output is applied to a multiplexer 428 to select one of four possible registers $CMN0_0$ . . . $CMN0_3$ to output to a controlled circuit (e.g., like controlled circuits 410, 412 in FIG. 4A). The multiplexer 428 thus replaces one of the multiplexers 414a, 414b shown in FIG. 4A. If the multiplexer 428 is configured to respond to 4 direct selector inputs (e.g., C0 . . . C3), rather than binary encoded selector bits, the priority encoder 426 may be omitted and the outputs of the flipflops 422a . . . 422d may be directly coupled to that type of multiplexer 428.

As should be appreciated, other circuits may be devised that provide "radio button" functionality for outputting the last written one of m inputs. Thus, the invention encompasses a selection circuit, coupled to two or more bus decoders on separate buses and to a multiplexer having input bus ports coupled to two or more common registers, the selection circuit being configured to select an input bus port of the multiplexer in response to the assertion of a last write-complete signal from the coupled bus decoders.

The circuit of FIG. 4B may be replicated as may be desired for additional common registers CMN # and corresponding Write Complete output signals WC0 #. As should be clear, the "radio button" circuit 420 can be adapted to accommodate more than, or fewer than, four MIPI controllers (the case of two MIPI controllers essentially devolving down to the flipflop and multiplexer configuration shown in FIG. 4A).

The concepts shown in FIGS. 4A and 4B may be extended to additional common registers CMN #. For example, the circuit of FIG. 4B may be replicated for an additional common register CMN1 having corresponding Write Complete output signals WC1. The circuit of FIG. 4B may also be used with multiple common registers CMN # and multiple MIPI controllers.

While the examples above have associated a Write Complete output signal WC # with a single common register CMN #, in some embodiments, one Write Complete output signal WC # may be associated with a set of two or more registers, such that when any register within the set is written to by a corresponding MIPI controller, the entire set of registers from the last-written MIPI bus is declared the winner. For example, referring to FIG. 4A, common registers CMN0, CMN1 may be considered to be a set, such that the last write to either register within a decoder 402a, 402b from either MIPI control 401a, 401b will cause the contents of both registers CMN0, CMN1 to be passed through multiplexer 414b to controlled circuit 412 (of course, multiplexer 414b must be coupled to both registers CMN0, CMN1).

In some embodiments, a Write Complete output signal WC # may be associated with a field within a single common register CMN #. A field is a subset of bits within the register (e.g., an 8-bit register may have two 4-bit fields). Accordingly, for common registers that support masked writes (a known MIPI capability), a Write Complete output signal WC # may be asserted when the bits of a field are written, allowing the last written field to be coupled to a controlled circuit.

Under certain conditions, a non-latching "last write" combinatorial circuit may be used rather than the S-R flipflops shown in FIG. 4A. For example, referring to FIG. 4A, the flipflops 416a, 416b may be replaced by OR gates if the common registers CMN # that are not going to be selected are first cleared (e.g., by a MIPI command), in which case the Write Complete output signal WC # for the common register CMN # that is going to be selected will cause the corresponding multiplexer to output that common register CMN #. Similarly, referring to FIG. 4B, the radio button circuit 420 may be omitted if the common registers CMN # that are not going to be selected are first cleared. Further, if the multiplexer 428 is configured to respond to direct selector inputs, the priority encoder 426 itself may be omitted, as described above. In alternative embodiments, if it is known that the CMN0 # are to be cleared after assertion, then the multiplexer 428 may be replaced with OR gates (i.e., OR'ing all CMN0 # signals together to produce the output of FIG. 4B) and the radio button circuit 420 may be omitted.

While some of the embodiments described above use the MIPI RFFE serial bus as an example of a serial bus, the invention is not limited to that particular serial bus. As should be clear from the entirety of this disclosure, the example given above of the MIPI RFFE bus is but one of many possible buses (at various clock rates) that may advantageously utilize the inventive concepts of this disclosure. Accordingly, embodiments of the invention may be used with other serial buses, such as the Serial Peripheral Interface (SPI), I2C, I2S, SMBus, and/or PMBus. Further, embodiments of the invention may also be used with applications using parallel bus standards in which a clock signal is associated with parallel address and data busses (e.g., AMBA), or even a combination of serial and parallel busses.

Circuit Embodiments

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 5:
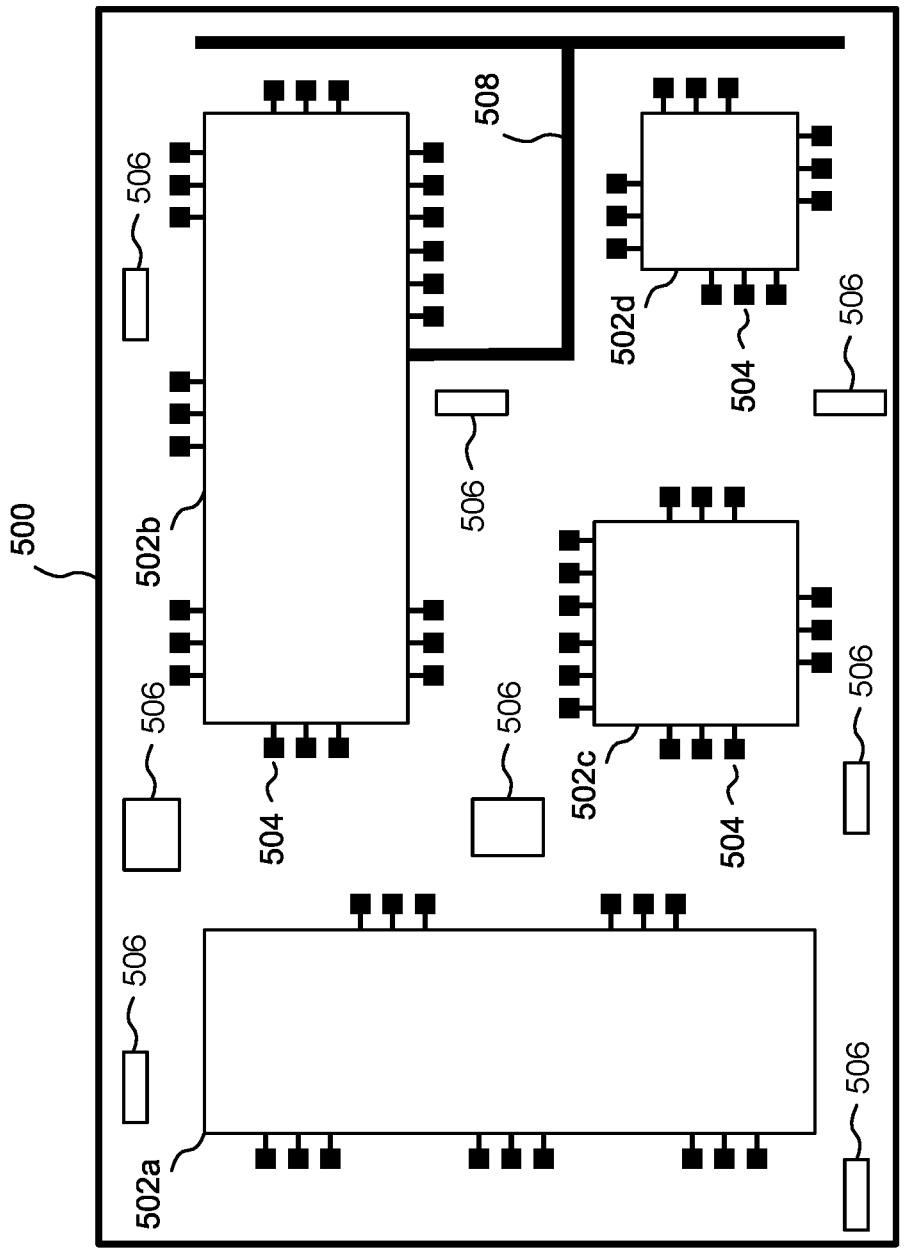
FIG. 5 is a top plan view of a substrate that may be, for example, a printed circuit board or chip module substrate (e.g., a thin-film tile).

As one example of further integration of embodiments of the present invention with other components, FIG. 5 is a top plan view of a substrate 500 that may be, for example, a printed circuit board or chip module substrate (e.g., a thin-film tile). In the illustrated example, the substrate 500 includes multiple ICs 502a-502d having terminal pads 504 which would be interconnected by conductive vias and/or traces on and/or within the substrate 500 or on the opposite (back) surface of the substrate 500 (to avoid clutter, the surface conductive traces are not shown and not all terminal pads are labelled). The ICs 502a-502d may embody, for example, signal switches, active filters, amplifiers (including one or more LNAs), and other circuitry. Some or all of the ICs 502a-502d may include circuits coupled to and controlled by one or more MIPI RFFE serial buses.

The substrate 500 may also include one or more passive devices 506 embedded in, formed on, and/or affixed to the substrate 500. While shown as generic rectangles, the passive devices 506 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 500 to other passive devices 506 and/or the individual ICs 502a-502d.

The front or back surface of the substrate 500 may be used as a location for the formation of other structures. For example, one or more so-called patch antennae may be formed on or affixed to the front or back surface of the substrate 500; one example of a front-surface patch antenna 508 is shown, coupled to an IC die 502b, which may include RF front-end circuitry. A patch antenna, and various known variations, is a type of radio antenna with a low profile which can be formed or mounted on a flat surface. Thus, by including one or more patch antennae on the substrate 500, a complete radio may be created.

System Aspects

Embodiments of the present invention are useful in a wide variety of larger radio frequency (RF) circuits and systems for performing a range of functions. Such functions are useful in a variety of applications, such as radio systems (including cellular radio systems), radar systems (including phased array and automotive radar systems), and test equipment.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, and WiFi (e.g., 802.11a, b, g, ac, ax), as well as other radio communication standards and protocols.

Figure 6:
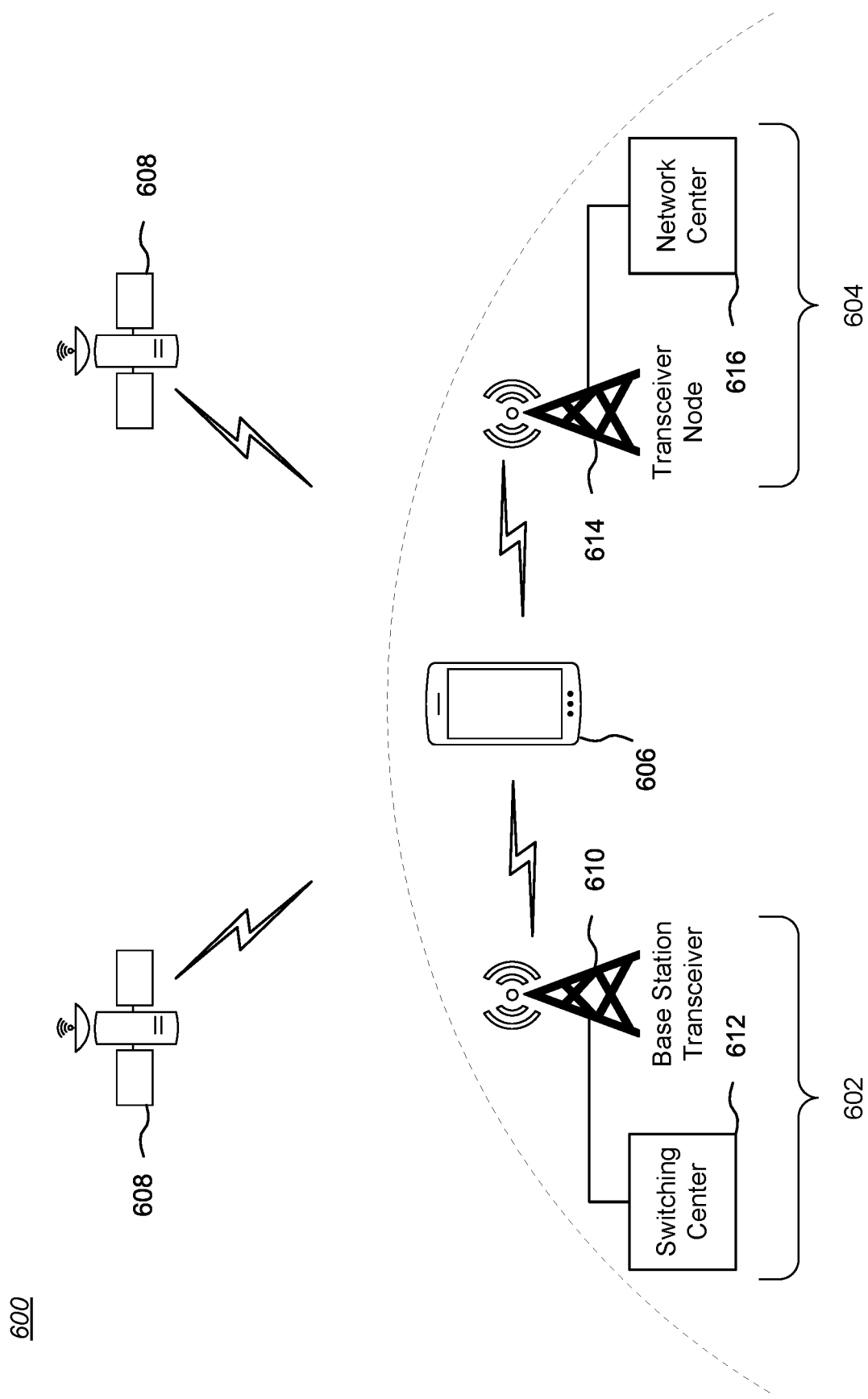
FIG. 6 illustrates an exemplary prior art wireless communication environment comprising different wireless communication systems, and which may include one or more mobile wireless devices.

As an example of wireless RF system usage, FIG. 6 illustrates an exemplary prior art wireless communication environment 600 comprising different wireless communication systems 602 and 604, and which may include one or more mobile wireless devices 606.

A wireless device 606 may be capable of communicating with multiple wireless communication systems 602, 604 using one or more of the telecommunication protocols noted above. A wireless device 606 also may be capable of communicating with one or more satellites 608, such as navigation satellites (e.g., GPS) and/or telecommunication satellites. The wireless device 606 may be equipped with multiple antennas, externally and/or internally, for operation on different frequencies and/or to provide diversity against deleterious path effects such as fading and multi-path interference. A wireless device 606 may be a cellular phone, a personal digital assistant (PDA), a wireless-enabled computer or tablet, or some other wireless communication unit or device. A wireless device 606 may also be referred to as a mobile station, user equipment, an access terminal, or some other terminology.

The wireless system 602 may be, for example, a CDMA-based system that includes one or more base station transceivers (BSTs) 610 and at least one switching center (SC) 612. Each BST 610 provides over-the-air RF communication for wireless devices 606 within its coverage area. The SC 612 couples to one or more BSTs in the wireless system 602 and provides coordination and control for those BSTs.

The wireless system 604 may be, for example, a TDMA-based system that includes one or more transceiver nodes 614 and a network center (NC) 616. Each transceiver node 614 provides over-the-air RF communication for wireless devices 606 within its coverage area. The NC 616 couples to one or more transceiver nodes 614 in the wireless system 604 and provides coordination and control for those transceiver nodes 614.

In general, each BST 610 and transceiver node 614 is a fixed station that provides communication coverage for wireless devices 606, and may also be referred to as base stations or some other terminology. The SC 612 and the NC 616 are network entities that provide coordination and control for the base stations and may also be referred to by other terminologies.

Figure 7:
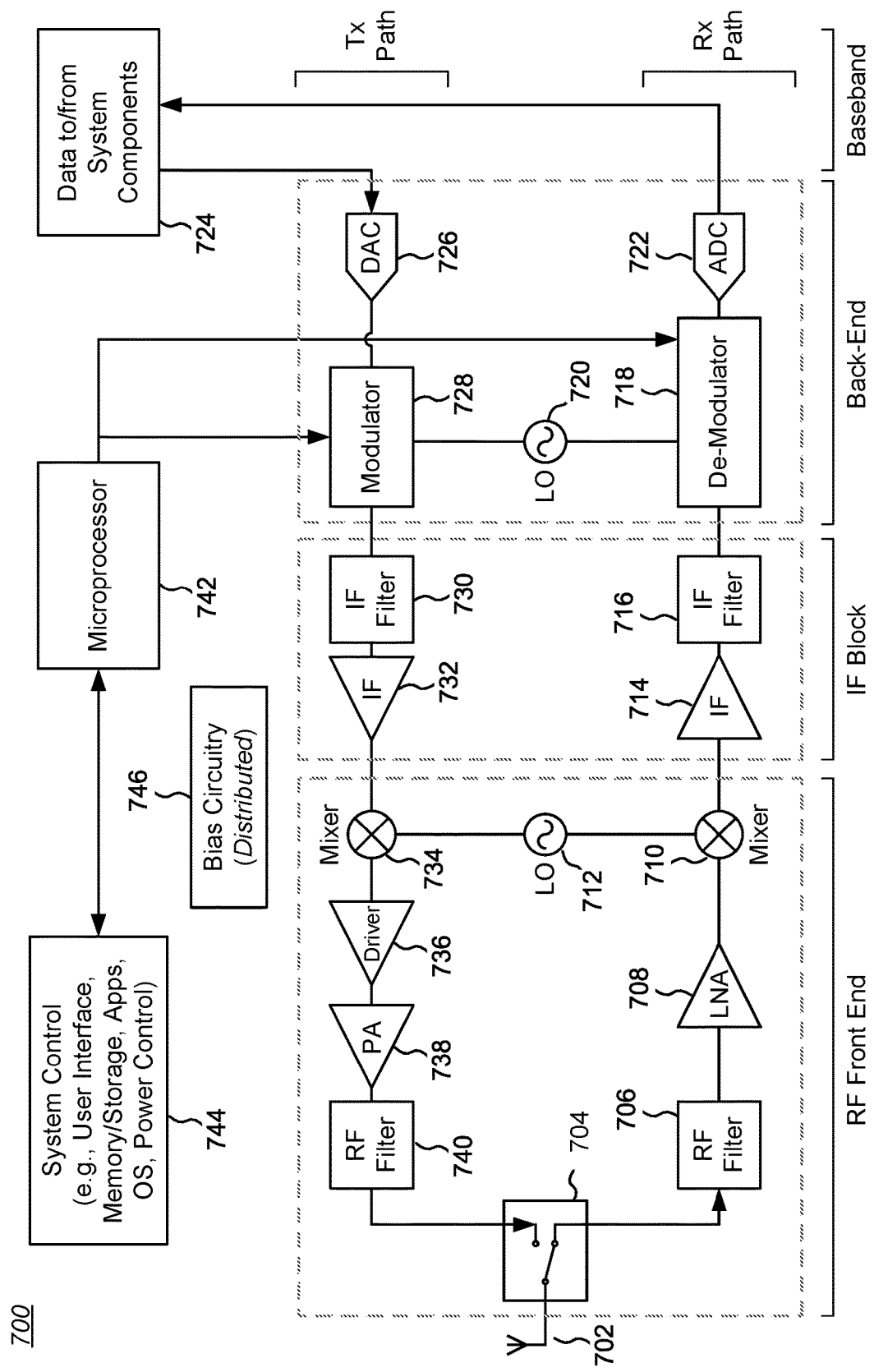
FIG. 7 is a block diagram of a transceiver 700 that might be used in a wireless device, such as a cellular telephone, and which may beneficially incorporate an embodiment of the present invention for improved performance.

An important aspect of any wireless system, including the systems shown in FIG. 6, is in the details of how the component elements of the system perform. FIG. 7 is a block diagram of a transceiver 700 that might be used in a wireless device, such as a cellular telephone, and which may beneficially incorporate an embodiment of the present invention for improved performance. As illustrated, the transceiver 700 includes a mix of RF analog circuitry for directly conveying and/or transforming signals on an RF signal path, non-RF analog circuitry for operational needs outside of the RF signal path (e.g., for bias voltages and switching signals), and digital circuitry for control and user interface requirements. In this example, a receiver path Rx includes RF Front End, IF Block, Back-End, and Baseband sections (noting that in some implementations, the differentiation between sections may be different).

The receiver path Rx receives over-the-air RF signals through an antenna 702 and a switching unit 704, which may be implemented with active switching devices (e.g., field effect transistors or FETs), or with passive devices that implement frequency-domain multiplexing, such as a diplexer or duplexer. An RF filter 706 passes desired received RF signals to a low noise amplifier (LNA) 708, the output of which is combined in a mixer 710 with the output of a first local oscillator 712 to produce an intermediate frequency (IF) signal. The IF signal may be amplified by an IF amplifier 714 and subjected to an IF filter 716 before being applied to a demodulator 718, which may be coupled to a second local oscillator 720. The demodulated output of the demodulator 718 is transformed to a digital signal by an analog-to-digital converter 722 and provided to one or more system components 724 (e.g., a video graphics circuit, a sound circuit, memory devices, etc.). The converted digital signal may represent, for example, video or still images, sounds, or symbols, such as text or other characters.

In the illustrated example, a transmitter path Tx includes Baseband, Back-End, IF Block, and RF Front End sections (again, in some implementations, the differentiation between sections may be different). Digital data from one or more system components 724 is transformed to an analog signal by a digital-to-analog converter 726, the output of which is applied to a modulator 728, which also may be coupled to the second local oscillator 720. The modulated output of the modulator 728 may be subjected to an IF filter 730 before being amplified by an IF amplifier 732. The output of the IF amplifier 732 is then combined in a mixer 734 with the output of the first local oscillator 712 to produce an RF signal. The RF signal may be amplified by a driver 736, the output of which is applied to a power amplifier (PA) 738. The amplified RF signal may be coupled to an RF filter 740, the output of which is coupled to the antenna 702 through the switching unit 704.

The operation of the transceiver 700 is controlled by a microprocessor 742 in known fashion, which interacts with system control components (e.g., user interfaces, memory/storage devices, application programs, operating system software, power control, etc.). In addition, the transceiver 700 will generally include other circuitry, such as bias circuitry 746 (which may be distributed throughout the transceiver 700 in proximity to transistor devices), electrostatic dis-charge (ESD) protection circuits, testing circuits (not shown), factory programming interfaces (not shown), etc.

In modern transceivers, there are often more than one receiver path Rx and transmitter path Tx, for example, to accommodate multiple frequencies and/or signaling modalities. Further, as should be apparent to one of ordinary skill in the art, some components of the transceiver 700 may be in a positioned in a different order (e.g., filters) or omitted. Other components can be (and usually are) added (e.g., additional filters, impedance matching networks, variable phase shift-ers/attenuators, power dividers, etc.).

As a person of ordinary skill in the art will understand, a system architecture is beneficially impacted by the current invention in critical ways, including improved design flexibility for systems requiring multiple serial buses.

Methods

Figure 8:
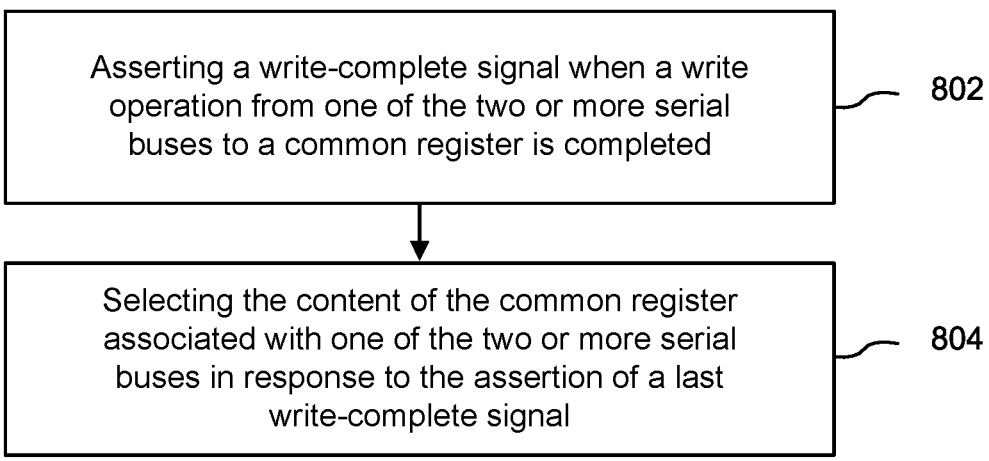
FIG. 8 is a process flow chart showing one method for enabling common control of one or more agent devices by two or more buses.

Another aspect of the invention includes methods for enabling common control of one or more agent devices by two or more serial buses. For example, FIG. 8 is a process flow chart 800 showing one method for enabling common control of one or more agent devices by two or more serial buses. The method includes: asserting a write-complete signal when a write operation from one of the two or more serial buses to a common register is completed (Block 802); and selecting the content of the common register associated with one of the two or more serial buses in response to the assertion of a last write-complete signal (Block 804).

Additional aspects of the above method may include one or more of the following: wherein at least one write-complete signal is associated with at least two common registers; and/or wherein at least one write-complete signal is associated with a field within one common register.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as CMOS, SOI CMOS, bipolar, BiCMOS, LDMOS, BCD, GaAs HBT, GaN HEMT, GaAs pHEMT, and MESFET technologies.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A circuit that enables common control of one or more agent devices by two or more buses using mutually exclusive arbitration, the circuit including:
   (a) at least two decoders, each including:
      (1) at least one common register;
      (2) a bus decoder coupled to the at least one common register and configured to be coupled to a respective bus, the bus decoder configured to assert a write-complete signal when a write operation to a corresponding one of the at least one common register is completed;
   (b) a multiplexer having at least two selectable input bus ports each coupled to one of the at least one common register within respective ones of the at least two decoders, and an output port configured to be coupled to at least one of the one or more agent devices; and
   (c) a selection circuit, coupled to two or more of the bus decoders and to the multiplexer, the selection circuit configured to select an input bus port of the multiplexer in response to the assertion of a last write-complete signal from the coupled bus decoders.

2. The invention of claim 1, wherein at least one write-complete signal is associated with at least two common registers.

3. The invention of claim 1, wherein at least one write-complete signal is associated with a field within one common register.

4. The invention of claim 1, wherein the selection circuit includes at least one flipflop, each coupled to the bus decoder of two of the at least two decoders and to the multiplexer, the at least one flipflop configured to select an input bus port of the multiplexer in response to the assertion of a last write-complete signal from one of the two bus decoders.

5. The invention of claim 4, wherein the output of each flipflop is set in response to the assertion of a write-complete signal from a first associated bus decoder, and reset in response to the assertion of a write-complete signal from a second associated bus decoder.

6. The invention of claim 4, wherein at least one write-complete signal is associated with at least two common registers.

7. The invention of claim 4, wherein at least one write-complete signal is associated with a field within one common register.

8. The invention of claim 1, wherein the selection circuit includes a radio button circuit coupled to the bus decoder of the at least two decoders and to the multiplexer, the radio button circuit configured to select an input bus port of the multiplexer in response to the assertion of a last write-complete signal from one of the bus decoders.

9. The invention of claim 8, wherein the radio button circuit includes at least two flipflops each having an output, the output of each flipflop being set in response to the assertion of a write-complete signal from an associated bus decoder, and reset in response to the assertion of a write-complete signal from any other bus decoder.

10. The invention of claim 9, further including a priority encoder coupled between the outputs of the flipflops and binary-coded selector inputs of the multiplexer, the priority encoder configured to convert the outputs of the flipflops to a binary-coded value.

11. The invention of claim 8, wherein at least one write-complete signal is associated with at least two common registers.

12. The invention of claim 8, wherein at least one write-complete signal is associated with a field within one common register.

13. The invention of claim 1, wherein the selection circuit includes at least one OR gate, each coupled to the bus decoder of two of the at least two decoders and to the multiplexer, the at least one OR gate configured to select an input bus port of the multiplexer in response to the assertion of a last write-complete signal from one of the two bus decoders after the other one of the two bus decoders has been cleared.

14. The invention of claim 13, wherein at least one write-complete signal is associated with at least two common registers.

15. The invention of claim 13, wherein at least one write-complete signal is associated with a field within one common register.

16. A circuit that enables common control of an agent device by two buses using mutually exclusive arbitration, the circuit including:
   (a) two decoders, each including:
      (1) a common register;
      (2) a bus decoder coupled to the common register within the decoder and configured to be coupled to a respective bus, the bus decoder configured to assert a write-complete signal when a write operation to the common register is completed;
   (b) a multiplexer having two selectable input bus ports each coupled to the common register within respective ones of the two decoders, and an output port configured to be coupled to the agent device; and
   (c) a flipflop coupled to the bus decoder of the two decoders and to the multiplexer, the flipflop configured to select an input bus port of the multiplexer in response to the assertion of a last write-complete signal from one of the two bus decoders.

17. The invention of claim 16, wherein the output of each flipflop is set in response to the assertion of a write-complete signal from a first bus decoder, and reset in response to the assertion of a write-complete signal from a second bus decoder.

18. The invention of claim 16, wherein at least one write-complete signal is associated with at least two common registers.

19. The invention of claim 16, wherein at least one write-complete signal is associated with a field within one common register.

* * * * *